UNITED STATES PATENT OFFICE.

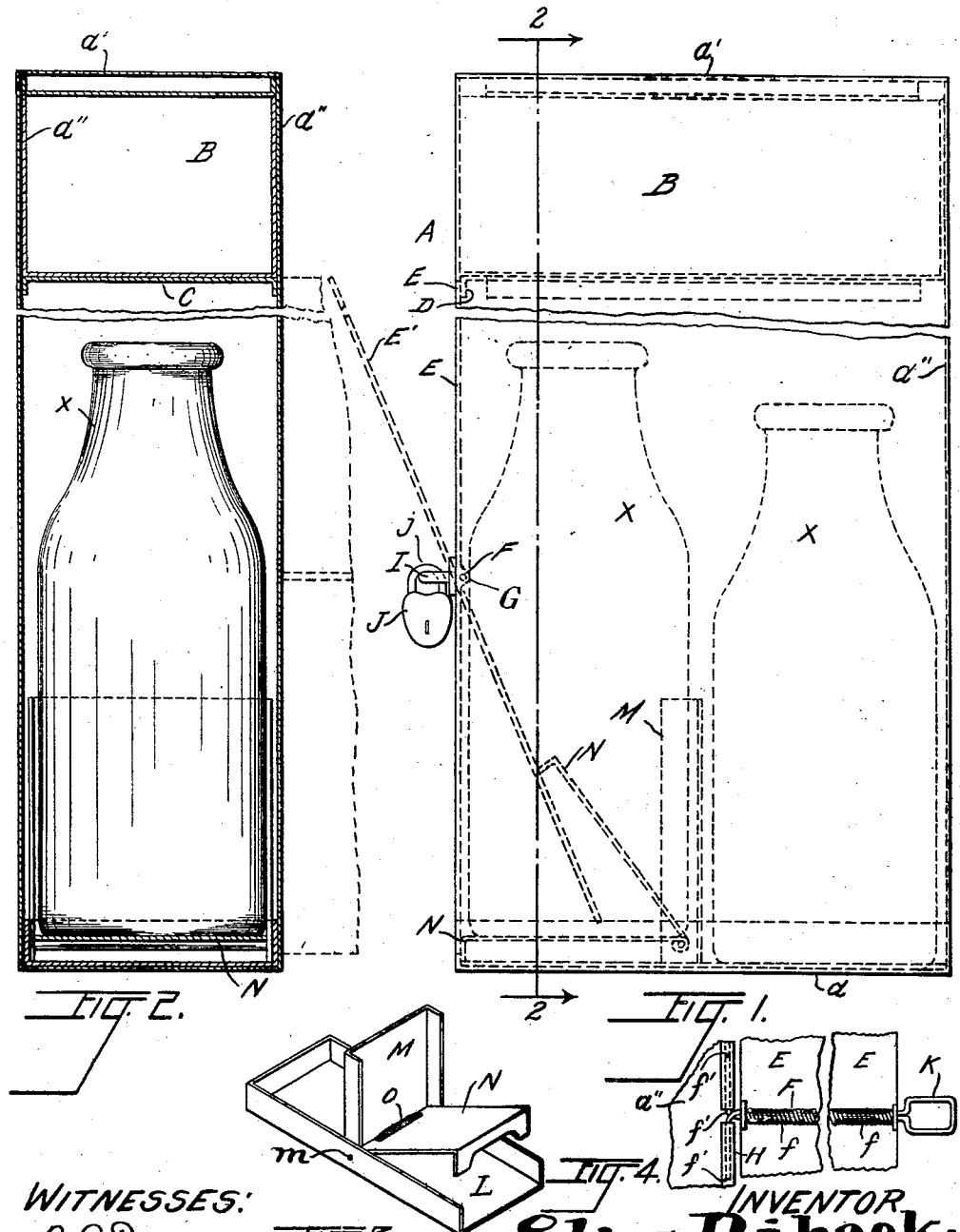

ELIAS RIBACK, OF CHICAGO, ILLINOIS.

MILK-SAFE.

968,264.  Specification of Letters Patent.  Patented Aug. 23, 1910.

Application filed March 2, 1910. Serial No. 546,895.

*To all whom it may concern:*

Be it known that I, ELIAS RIBACK, a citizen of the United States, and a resident of the city of Chicago, in the county of Cook and State of Illinois, have invented certain new and useful Improvements in Milk-Safes, of which the following, when taken in connection with the drawing accompanying and forming a part hereof, is a full and complete description, sufficient to enable those skilled in the art to which it pertains to understand, make, and use the same.

This invention relates to milk safes used for the deposit of bottles of milk by a milkman, and the deposit of empty milk bottles by the consumer.

The object of the invention is to obtain a milk safe which can be locked by the consumer; but in such manner that any empty milk bottles contained therein can be removed by a milk dealer and bottles containing milk or cream can be deposited therein; and the deposit of said bottles of milk or cream will, (upon the deposit of the last one of said bottles), automatically lock the safe so that none of the bottles so deposited can be removed except by unlocking the door of said safe.

A further object of the invention is to obtain what is known in the trade as a sanitary device.

A further object of the invention is to obtain a device of the kind named which will be economical in construction, durable, not liable to get out of order, easily operated, and will protect the milk or cream therein from rain or snow.

A further object of the invention is to obtain a device of the kind named which may be refrigerated during the summer months.

In the drawing referred to Figure 1 is a side elevation of the device, with broken lines indicating milk bottles deposited therein in such manner as to lock the door thereof in a closed position; and with broken lines indicating the position of said door at the time said bottles were placed therein. Fig. 2 is a vertical sectional view on line 2—2 of Fig. 1 viewed in the direction indicated by the arrows, with broken lines indicating the position of the door of the device at the time the milk bottles contained therein may be removed therefrom. Fig. 3 is a perspective of a tray, a vertical wall thereto and a movable base therein, all forming elements in a device embodying the invention, and Fig. 4 is an elevation of a portion of one of the side walls of the device and of a portion of the door of the device.

A reference letter applied to designate a given part is used to indicate said part throughout the several figures of the drawing, wherever the same appears.

A is the casing of the device, consisting of the bottom $a$, the top $a'$, the sides $a''$, $a'''$ and a back.

B is a drawer, arranged to slide on the base or guide C.

D is a projection extending downward from the bottom of drawer B, adjacent to the front end of said drawer.

E is a door provided with two pivotal movements. The construction of the door and its hinges by means of which pivotal movement in two planes is obtainable is,— wire F is twisted together, as at $f$, Fig. 4, with the ends $f'$, $f'$, bent at a substantially right angle to the twisted part thereof, $(f)$; the door E is provided with ears G, G, through which the twisted part $f$ of wire F extends; and the portions $f'$, $f'$ of said wire are held in the turned over part H of one edge of one of the sides $a''$.

The apertures in ears G, G, are made large enough to permit the easy turning of the door on the twisted portion $f$ of wire F; and the part $f'$ of said wire turns easily in the turned over portion of the edge of side $a''$.

I is a post attached to one of the sides $a''$ to project forward of the front edge of said side, and is provided with an aperture through which the shackle $j$ of padlock J may be passed.

K is a loop in the end of the wire F, made to fit over the post I. When loop K is on post I and lever $j$ is through the aperture in said post I wire F extends across the opening which is closed by door E. By locking the padlock J wire F is held firmly in its position across said opening. When wire F is locked, as described, across the opening which is closed by the door E, said door may be turned from a vertical position into the position indicated by broken lines E', Fig. 1. When the door is in this position bottles may be inserted above the door into the device.

To automatically lock the door in a vertical position by the insertion of the last bottle desired to be put into the device I provide the several elements illustrated in perspective in Fig. 3, and indicated by broken lines in Fig. 1. Said elements comprise tray L, partition M, pivoted table N, pivotal wire m, and spring O. The tray is slid into place in the casing of the device, and when a bottle is put into the device so that the partition M guides it on to the pivoted table N, the weight of said bottle, (particularly when said bottle contains milk or cream), will force said table into a substantially horizontal position (as illustrated in Fig. 2), so that the end of said table which is adjacent to the lower end of the door forms an abutment forcing said door into a substantially vertical position, and retaining it in said vertical position. Access to the device can then be obtained only by removing the padlock J and turning the door on part or portion f' of wire F. Further, when the door is held in a vertical position by the end of pivoted table N the upper end of said door is against the projection D on drawer B, and said drawer is thereby locked closed.

The drawer B is designed as a receptacle for ice, to be placed therein when refrigeration is desired.

When a bottle is placed in the device to rest on the top of the partition M the door can be turned into a closed position, to protect the contents of said device from rain or snow, and said door can at any time be turned from a vertical position into the position indicated by broken lines in Fig. 1, and said bottle removed. This operation is resorted to in the case of putting empty bottles therein to be taken therefrom by the milk dealer.

X, X, are milk bottles.

When a device embodying this invention is designed to hold a single milk bottle the receptacle is of less depth than where a plurality of bottles are designed to be deposited therein, and in such case the partition M is, of course, omitted.

Having thus described my invention, what I claim as new and desire to secure by Letters Patent is,—

1. The combination of a casing provided with an opening, a door on the casing to close said opening, said door movable on a horizontal axis and movable on a vertical axis, a movable table in said casing, the end of said table which is adjacent to the door, when said table is moved into a determined position, abutting against said door to prevent movement of said door on the horizontal axis, means to yieldingly hold the table in a position with said end moved from said determined position, to permit movement of said door on the horizontal axis, and means to lock said door to prevent movement thereof on the vertical axis; substantially as described.

2. The combination of a casing provided with an opening, a door to close said opening, said door movable from said closed position on a horizontal axis and movable on a vertical axis, a movable table in said casing, a partition in said casing, said casing positioned to form a guide, to direct a bottle onto the movable table, the end of said table which is adjacent to said door, when a bottle is directed thereonto, abutting against said door to prevent movement of the door on the horizontal axis, means to yieldingly hold the table with said end moved from said determined position to permit movement of the door on the horizontal axis, and means to lock said door to prevent movement thereof on said vertical axis.

3. The combination of a casing provided with an opening, a door to close said opening, said door movable from said closed position on a horizontal axis and movable on a vertical axis, with a removable tray in said casing, a vertical wall in said tray to form a partition when the tray is in the casing, and a movable table in said tray, the end of said table which is adjacent to the door movable into position to abut against the door to prevent movement of said door on the horizontal axis, means to yieldingly hold the table away from said abutting position and thereby to permit movement of said door on said horizontal axis, and means to lock said door to prevent movement thereof on said vertical axis.

4. The combination of a casing provided with an opening, a door to close said opening, said door movable from said closed position on a horizontal axis and movable on a vertical axis, a drawer in said casing, a projection on said drawer, said projection positioned to engage with the door when the door is closed and to thereby lock said drawer closed, a movable table in said casing, the end of said table which is adjacent to said door, when said table is moved into a determined position abutting against the door to prevent movement of the door on the horizontal axis, means to yieldingly hold the table with said end moved from said determined position to permit movement of the door on the horizontal axis and in position to receive the weight of an object thereon to automatically move it to said determined position, and means to lock said door to prevent movement thereof on said vertical axis.

ELIAS RIBACK.

In the presence of—
CHARLES TURNER BROWN,
EDWARD J. BROWN.